United States Patent

Kajiwara

[11] Patent Number: 6,061,533
[45] Date of Patent: May 9, 2000

[54] GAMMA CORRECTION FOR APPARATUS USING PRE AND POST TRANSFER IMAGE DENSITY

[75] Inventor: Tadayuki Kajiwara, Chikushino, Japan

[73] Assignee: Matsushita Electric Industrial Co., Ltd., Osaka, Japan

[21] Appl. No.: 09/193,714

[22] Filed: Nov. 17, 1998

[30] Foreign Application Priority Data

Dec. 1, 1997 [JP] Japan ................................ 9-329951

[51] Int. Cl.⁷ .................................................. G03G 15/00
[52] U.S. Cl. ............................................. 399/49; 399/74
[58] Field of Search .................... 399/46, 49, 74

[56] References Cited

U.S. PATENT DOCUMENTS

| | | | |
|---|---|---|---|
| 4,277,162 | 7/1981 | Kasahara et al. | 399/49 |
| 5,294,959 | 3/1994 | Nagao et al. | 399/44 |
| 5,307,119 | 4/1994 | Folkins et al. | 399/74 X |
| 5,566,372 | 10/1996 | Ikeda et al. | 399/46 |
| 5,697,012 | 12/1997 | Sasanuma et al. | 399/49 |

FOREIGN PATENT DOCUMENTS 0535655  4/1993  European Pat. Off. .
2273790  6/1994  United Kingdom .

*Primary Examiner*—Fred L. Braun
*Attorney, Agent, or Firm*—Stevens, Davis, Miller & Mosher, L.L.P.

[57] ABSTRACT

An image forming apparatus performs the gamma correction based on an image density on a photosensitive body or an intermediate transfer body. In the image forming apparatus, a test pattern generator unit generates a test image on the photosensitive body or the intermediate transfer body. A first density detector unit is provided in an upstream of a toner transfer section with respect to a rotation direction of the photosensitive body or the intermediate transfer body, and detects an image density on the photosensitive body or the intermediate transfer body. A second density detector unit is provided in a downstream of the toner transfer section with respect to the rotation direction of the photosensitive body or the intermediate transfer body, and detects the image density on the photosensitive body or the intermediate transfer body. A corrector unit corrects image data. A control unit calculates correction data for use in correcting the image data based on image density data outputted from the first and second density detector units to set the correction data in the corrector unit.

11 Claims, 13 Drawing Sheets

GAMMA CORRECTION FOR APPARATUS USING PRE AND POST TRANSFER IMAGE DENSITY

BACKGROUND OF THE INVENTION

1. Field of the Invention

The present invention relates to an image forming apparatus for use in obtaining a high-quality record image, and more particularly to image correction in image formation using an electrophotography architecture.

2. Description of the Related Art

Today, a digital electrophotographic device using an electrophotography process and a laser scanning technology for use as an output terminal of a digital equipment, such as a personal computer and a workstation or the like, is becoming more important in the manufacture of printers due to superiority including accelerated recordability and enhanced print quality. Especially, as demands for color visualization of computer-produced documents increase in recent years, a complete or full color-generatable image forming apparatus becomes available in the market.

A conventional image forming apparatus using an electrophotography technique will be explained hereinafter. FIG. 8 is a diagram showing an overall configuration of a conventional color image forming apparatus using electrophotography. Reference numeral 8 designates a photosensitive drum. The photosensitive drum 8 consists essentially of an aluminum drum, charge-generating layer (CGL), and charge transfer layer (CTL). The photosensitive drum 8 is driven by a drive motor (not shown) to rotate in a specified direction designated by arrow "A".

There are provided on the circumferential surface of the photosensitive drum 8 an electrification device or electrifier 9, exposing optical system 10, development rotary unit 12, and intermediate transfer body 13, which are disposed in the order of sequence along the rotation direction indicated by arrow "A". The development rotary unit 12 is provided with developing devices 11K, 11Y, 11M, 11C of respective colors such as black (K), yellow (Y), magenta (M) and cyan (C), which are operable to rotate once per print cycle of each color to come into circumferential contact with the photosensitive drum 8 for development.

The electrifier 9 is structured including an electrically chargeable brush (not shown) made of rayon. The electrifier 9 is brought into direct contact with the surface of the photosensitive drum 8 upon application of a negative voltage (approximately −1 KV) to the chargeable brush to thereby cause the surface to be uniformly electrified or charged at a negative potential of −600 V, or more or less.

The exposing optical system 10 is configured from a laser drive device, polygon mirror, lens system, polygon mirror rotating motor (scanner motor) and others (not shown). The exposing optical system 10 is operable to optically modulate and optically scan image data as indicated by arrow "B" to thereby form it as an electrostatic latent image on the charged surface of the photosensitive drum 8.

Each of the developing devices 11K, 11Y, 11M, 11C houses a development roller 14 using black, yellow, magenta or cyan toner particles and a conductive rubber, and a thin-layer roller 15. The development rotary unit 12 rotates in the arrow "C" direction once per print cycle of each color, so that each color developer comes into contact with the photosensitive drum 8.

In the initial print cycle, when the development rotary unit 12 is driven to rotate up to a specified position at which the black developer 11K is contacted with the photosensitive drum 8. Simultaneously, the development roller 14 is driven to rotate in the forward direction with respect to the arrow "A" direction of the photosensitive drum 8 at that position. Thereby, black toner particles thin-layered from the inside of a corresponding developer by the thin-layer roller 15K are supplied to the surface of the development roller 14K. The black toner is charged negatively due to friction at a time point of such thin-layer process.

A surface potential (bright potential) of the part of the surface of the photosensitive drum 8 at which the electrostatic latent image is created increases ranging between −50 to −100 V or therearound. Thereby, when a negative voltage of about −300 V is applied to the development roller 14K, an electric field is generated in the direction of from the photosensitive drum 8 toward the development roller 14K. As a result, the Coulomb force acts on the black toner, which is negatively charged on the development roller 14K, in the reverse direction of such electric field, i.e. in the direction of the photosensitive drum 8. Thereby, the black toner is attached to the latent image part formed on the photosensitive drum 8.

On the other hand, the remaining part on the surface of the photosensitive drum 8 at which any electrostatic latent image is not formed is −600 V in surface potential (dark potential). As a result, no electric field is created in the direction from the development roller to the photosensitive drum 8 even upon application of a development bias voltage thereto, so that no black toner is attached to the photosensitive drum 8. The aforementioned development process is generally called the "negative-positive process" or "inversion phenomena" due to the fact that toner is attached to only the part to which light is irradiated (namely, white).

Next, a positive intermediate transfer bias voltage of about 500 V is applied to the intermediate transfer body 13 to produce an electric field in the direction from the intermediate transfer body 13 to the photosensitive drum 8. As a result, the Coulomb force acts on the black toner, which is negatively charged on the photosensitive drum 8, in the reverse direction of such electric field, i.e. in the direction of the intermediate transfer body 13. Thereby, the black toner is transferred to the intermediate transfer body 13. The intermediate transfer body 13 is composed of a metal drum base tube which is made of aluminum or the like, and a belt-like sheet which is made of conductive resin or the like and is wound around the tube. The intermediate transfer body 13 is driven by a drive motor (not shown) to rotate in the arrow "D" direction.

When the black toner transfer is completed, the development rotary unit 12 rotates in the next print cycle, so that the cyan developer 11C comes into contact with the photosensitive drum 8. As in the black developer 11K, the cyan developer 11C operates to develop a cyan toner image on the photosensitive drum 8, and then the cyan toner is transferred from the photosensitive drum 8 to the intermediate transfer body 13. In this way, mono-color printing is repeatedly carried out on the intermediate transfer body 13 with respect to four colors in total to thereby form a lamination of four-color image components superimposed on one another. As a result, a full color image is formed.

When such color lamination on the intermediate transfer body 13 is completed, a sheet of paper 17 in a paper cassette 16 is transported into the main body of the apparatus by a paper-feed roller 18. When the paper sheet 17 is transported at a location corresponding to the intermediate transfer body 13 and transfer roller 19, a positive transfer bias voltage of about 1 KV is applied to the transfer roller 19. Thereby, an electric field is created in the direction of from the transfer roller 19 toward the intermediate transfer body 13. As a result, the Coulomb force acts on the color-stacked toner, which is negatively charged on the intermediate transfer body 13, in the reverse direction of the electric field, i.e. in the direction of the transfer roller 19. Thereby, color-superimposed toner image is transferred to the paper sheet 17. Further, a cleaning unit 23 comes into contact with the intermediate transfer body 13 at the same time when the image transfer is performed, so that any residual toner particles on the intermediate transfer body 13 are collected.

Lastly, the toner image that has been transferred to the paper sheet 17 is fixed on the paper sheet 17 by a fixing device 22, which includes a heat roller 20 being temperature-controlled by a halogen lamp (not shown) at a temperature of about 160° C. and a pressing roller 21, and is then outputted as a full color image.

On the other hand, as shown in FIG. 9, the image data and the outputted image density exhibit a typical input-output characteristic (referred to as "gamma characteristic" hereinafter) of the electrophotography process. Since this characteristic is not linear in the image density (tone property) with respect to a change in the density of the image data, the required image density is hardly obtainable at low-density (high light) portions, so that the image density is saturated at high-density portions. Therefore, the gamma correction, in which the image density on this intermediate transfer body 13 is detected by a density detector unit 24 and then the gamma characteristic is corrected into linearity, is employed in order to achieve the good continuous shading gradations with respect to the image data.

Here, the gamma correction will be explained. FIG. 10 is a conventional gamma correction control block diagram. In FIG. 10, reference numeral 4 designates an image processor unit for processing print data from a host computer (not shown) to output it as image data, reference numeral 5 designates a test pattern generator unit for generating test pattern image data shown in FIG. 11 in order to effect the gamma correction, and reference numeral 6 designates a corrector unit for converting the image data, which is outputted from the image processor unit 4 and test pattern generator unit 5, into it having the steady image density. More practically, the density detection of the test pattern image data outputted from the test pattern generator unit 5 is performed. The gamma correction, which is based on the correction data such as a look-up table or the like, is performed. Thereafter, the gamma correction of the image data outputted from the image processor unit 4 is performed on the basis of the correction data such as a lookup table or the like again.

Reference numeral 7 designates a modulator unit for optically modulating a semiconductor laser (not shown) of the exposing optical system 10 by the image data after conversion outputted from the corrector unit 6; reference numeral 24 designates a density detector unit for detecting by reflection light the density of the image data on the intermediate transfer body 13, which is outputted from the test pattern generator unit 5; and reference numeral 25 designates a control unit for inputting the image density data outputted from the density detector unit 24, for arithmetically processing the inputted image density data in a way such that the image data and the image density exhibit linearity, and for outputting the processed data to the corrector unit 6.

Next, the gamma correction will be explained. FIG. 12 is a flow chart of a conventional gamma correction sequence, FIG. 13A is a gamma characteristic diagram representing a relation of image data versus image density, and FIG. 13B is a gamma characteristic diagram representative of a relation of the image data versus image density after the gamma correction.

In the flow chart of FIG. 12, the initialization of a laser beam printer (LBP) is started after power-up (step 10). At this step, it is set whether or not the gamma correction is performed in an input unit (not shown) such as a front panel, and at the control unit 25 it is determined whether or not the gamma correction is performed (step 20). If the gamma correction is performed, then the control unit 25 controls the drive timing of each LBP to output a print signal to the test pattern generator unit 5.

As shown in FIG. 11, the test pattern generator unit 5 sequentially outputs the test pattern image data for black (BK) (step 30). The image data may be 8-bit data composed of 15 kinds of image data items: 11 (HEX), 22 (HEX), 33 (HEX), 44 (HEX), 55 (HEX), 66 (HEX), 77 (HEX), 88 (HEX), 99 (HEX), AA (HEX), BB (HEX), CC (HEX), DD (HEX), EE (HEX), and FF (HEX).

The outputted test pattern image data is converted by a conversion table (not shown) for black in the corrector unit 6, and then the modulator unit 7 optically modulates the semiconductor laser in the exposing optical system 10. Here, the conversion table is in one-to-one correspondence in the initial values thereof. The modulated test pattern image data becomes a black toner image on the intermediate transfer body 13, and then the density of such black image (toner) on the intermediate transfer body 13 is detected by the density detector unit 24 (step 40).

Here, the image density detected by the density detector unit 24 generally exhibits the characteristic as shown in FIG. 13A. In order that the control unit 25 corrects, as shown in FIG. 13B, the gamma characteristic into linearity based on this characteristic, the inverse function before correction is set in the black conversion table (not shown) within the corrector unit 6 (step 50). Prior to entering the next step, the surface of the intermediate transfer body 13 is cleaned by the cleaning control unit 23 to remove any residual toner powders away therefrom.

Similarly, the test pattern image data for cyan (C) is sequentially outputted (step 60), and then the cyan image (toner) density on the intermediate transfer body 13 is detected by the density detector unit 24 (step 70). In order to correct the gamma characteristic into linearity as shown in FIG. 13B, the inverse function before correction is set in a cyan's conversion table (not shown) within the corrector unit 6 (step 80). Prior to proceeding to the next step, the surface of the intermediate transfer body 13 is cleaned by the cleaning control unit 23 to remove residual toner particles away therefrom.

Similarly, the test pattern image data for magenta (M) is sequentially outputted (step 90), and then the magenta image (toner) density on the intermediate transfer body 13 is detected by the density detector unit 24 (step 100). In order to correct the gamma characteristic into linearity as shown in FIG. 13B, the inverse function before correction is set in a magenta's conversion table (not shown) within the corrector unit 6 (step 110). Prior to entering the next step, the surface of the intermediate transfer body 13 is cleaned by the cleaning control unit 23 to remove residual toner particles therefrom.

Similarly, the test pattern image data for yellow (Y) is sequentially outputted (step 120), and then the yellow image (toner) density on the intermediate transfer body 13 is detected by the density detector unit 24 (step 130). In order to correct the gamma characteristic into linearity as shown in FIG. 13B, the inverse function before correction is set in a yellow's conversion table (not shown) within the corrector unit 6 (step 140). Before going to the next step, the surface of the intermediate transfer body 13 is cleaned by the cleaning control unit 23 to remove residual toner particles away therefrom. In this way, the gamma correction processes for four colors are completed, and then the LBP is in the standby (on-line) state.

However, in the conventional gamma correction mentioned above, there is a problem that the image quality is reduced because it is impossible to realize the good continuous color shading gradations for the following reason. As the gamma correction is performed on the intermediate transfer body 13, when the real image density data is transferred and outputted to a sheet of paper, it is impossible to correct to the linearity as shown in FIG. 14 due to a change in transfer efficiency originated from the image density and any possible environmental variations or the like.

SUMMARY OF THE INVENTION

The present invention is to solve the problem faced with the prior art. An object of the present invention is to provide an image forming apparatus capable of achieving excellent continuous shading gradations by correcting the gamma characteristic to exhibit linearity in a way corresponding to a change in transfer efficiency due to image density and environmental alteration or the like even in the case of performing the correction on the intermediate transfer body.

An image forming apparatus of the present invention performs gamma correction based on an image density on a photosensitive body or an intermediate transfer body, and comprises: test pattern generator means for generating a test image on the photosensitive body or the intermediate transfer body; first density detector means provided in an upstream of a toner transfer section with respect to a rotation direction of the photosensitive body or the intermediate transfer body, for detecting an image density on the photosensitive body or the intermediate transfer body; second density detector means provided in a downstream of the toner transfer section with respect to the rotation direction of the photosensitive body or the intermediate transfer body, for detecting the image density on the photosensitive body or the intermediate transfer body; corrector means for correcting image data; and control means for calculating correction data for use in correcting the image data based on image density data outputted from said first and second density detector means to set the correction data in the corrector means.

With such an arrangement, it becomes possible to always correct the gamma characteristic in a way corresponding to a change in the transfer efficiency due to the image density and the environmental variations or the like to thereby enable achievement of the good continuous shading gradations.

DETAILED DESCRIPTION OF THE PREFERRED EMBODIMENTS

Figure 1:
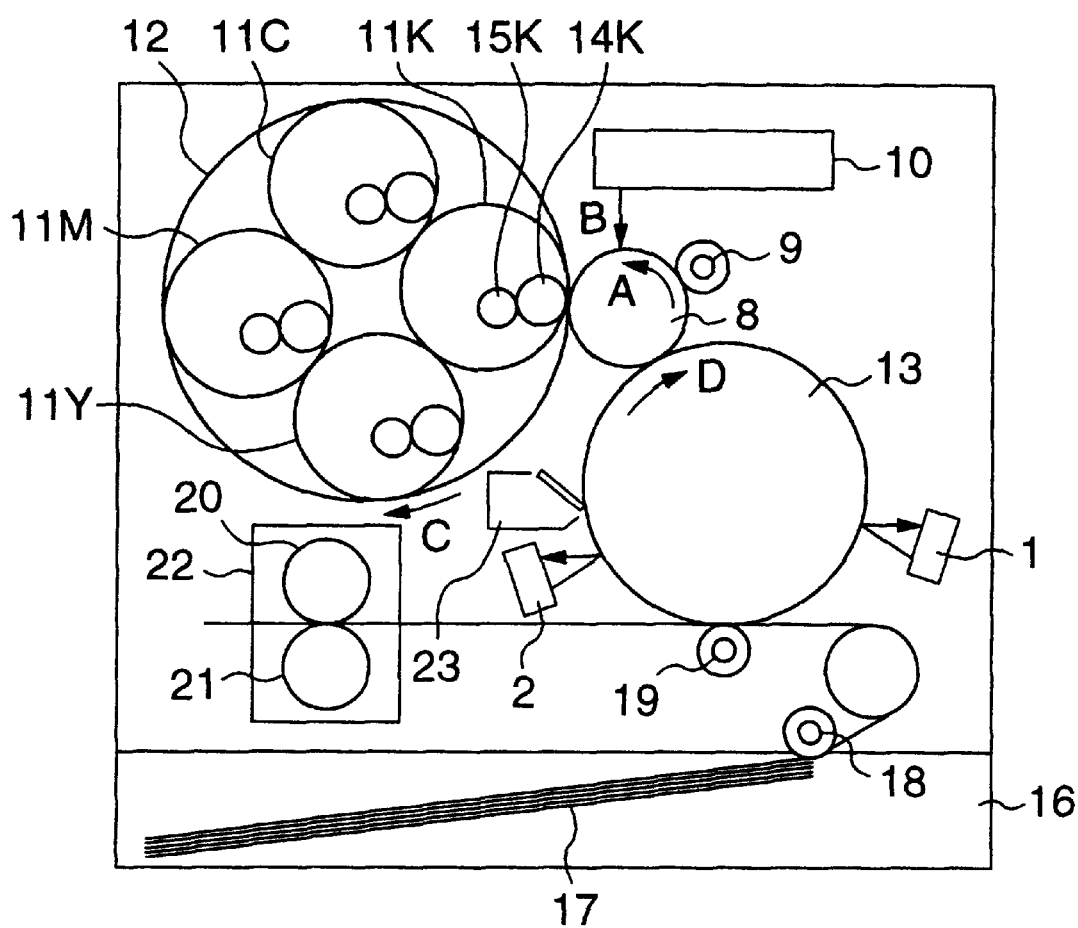
FIG. 1 is a diagram showing an overall configuration of a color image forming apparatus using electrophotography in a first embodiment of the present invention.

An image forming apparatus according to a first aspect of the present invention performs gamma correction based on an image density on a photosensitive body or an intermediate transfer body, and comprises: test pattern generator means for generating a test image on the photosensitive body or the intermediate transfer body; first density detector means provided in an upstream of a toner transfer section with respect to a rotation direction of the photosensitive body or the intermediate transfer body, for detecting an image density on the photosensitive body or the intermediate transfer body; second density detector means provided in a downstream of the toner transfer section with respect to the rotation direction of the photosensitive body or the intermediate transfer body, for detecting the image density on the photosensitive body or the intermediate transfer body; corrector means for correcting image data; and control means for calculating correction data for use in correcting the image data based on image density data outputted from the first and second density detector means to set the correction data in the corrector means. Therefore, the correction data is calculated from a difference between the image density data outputted from the first density detector means and the image density data outputted from the second density detector means to correct the gamma characteristic. As a result, it is possible to constantly correct the gamma characteristic to be linear in a way corresponding to the change in transfer efficiency due to the image density, so that the excellent continuous shading gradations can be realized.

An image forming apparatus according to a second aspect of the present invention performs gamma correction based on image density on a photosensitive body or an intermediate transfer body, and comprises: test pattern generator means for generating a test image on the photosensitive body or the intermediate transfer body; density detector means provided in an upstream and downstream of a toner transfer section with respect to a rotation direction of the photosensitive body or the intermediate transfer body, for detecting an image density on the photosensitive body or the intermediate transfer body; corrector means for correcting image data; and control means for calculating correction data for use in correcting the image data based on image density data before image transfer and image density data after image transfer both of which are outputted from said density detector means, to set the correction data in said corrector means. Therefore, it is possible to constantly correct the gamma characteristic to be linear in a way corresponding to the change in transfer efficiency due to the image density, so that the excellent continuous shading gradations can be realized.

In an image forming apparatus according to a third aspect of the present invention, the calculation of the correction data and the setup of the corrector means are performed in a non-print region every time an image is formed. Therefore, it is possible to constantly correct the gamma characteristic to be linear in a way which corresponds to the environmental variation, so that the excellent continuous color shading gradations can be realized.

(First Embodiment)

Figure 2:
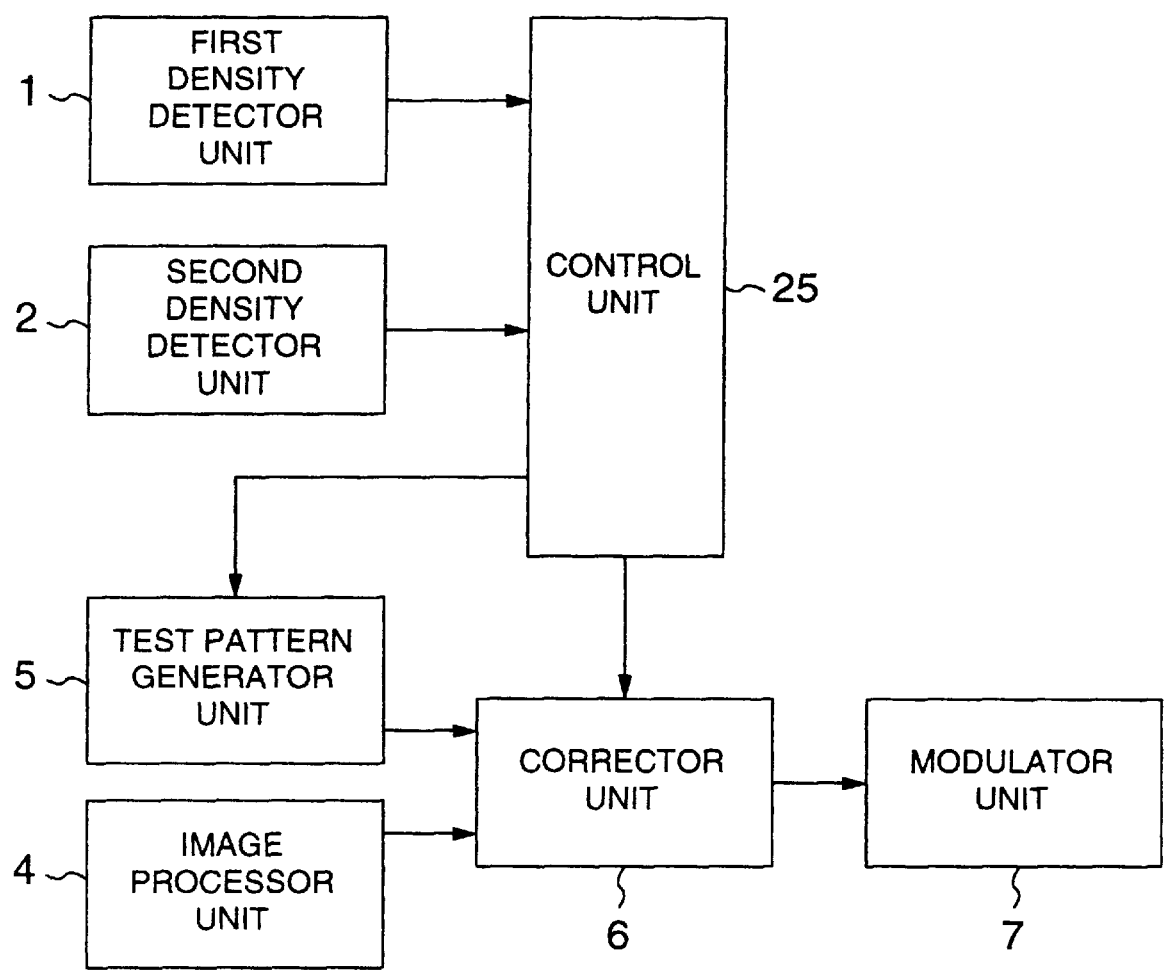
FIG. 2 is a gamma correction control block diagram in the first embodiment of the present invention.

A detailed explanation will be given of a first embodiment of the present invention below. FIG. 1 is a diagram showing an overall configuration of a color image forming apparatus using electrophotography in accordance with the first embodiment of the present invention. FIG. 2 is a gamma correction control block diagram in the first embodiment of the present invention.

In FIG. 1, the configuration except for a density detector unit is similar to that in the prior art, and an explanation thereof is eliminated herein. Reference numeral 1 designates a first density detector unit for detecting an upstream image density before image transfer on the intermediate transfer body 13; and 2 designates a second density detector unit for detecting a downstream image density after image transfer on the intermediate transfer body 13.

Figure 11:
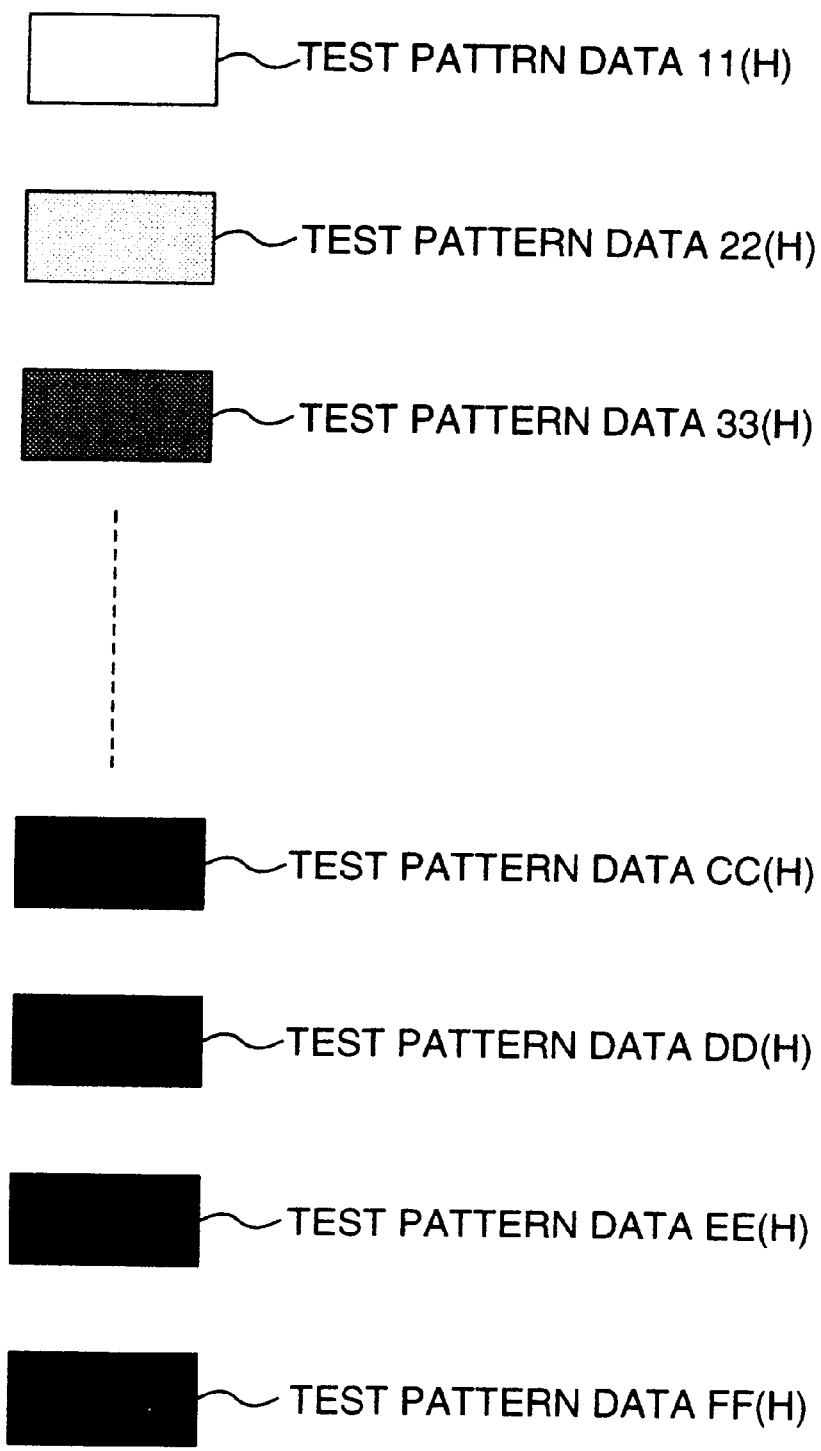
FIG. 11 is a diagram showing an example of a test pattern during gamma correction.
Figure 12:
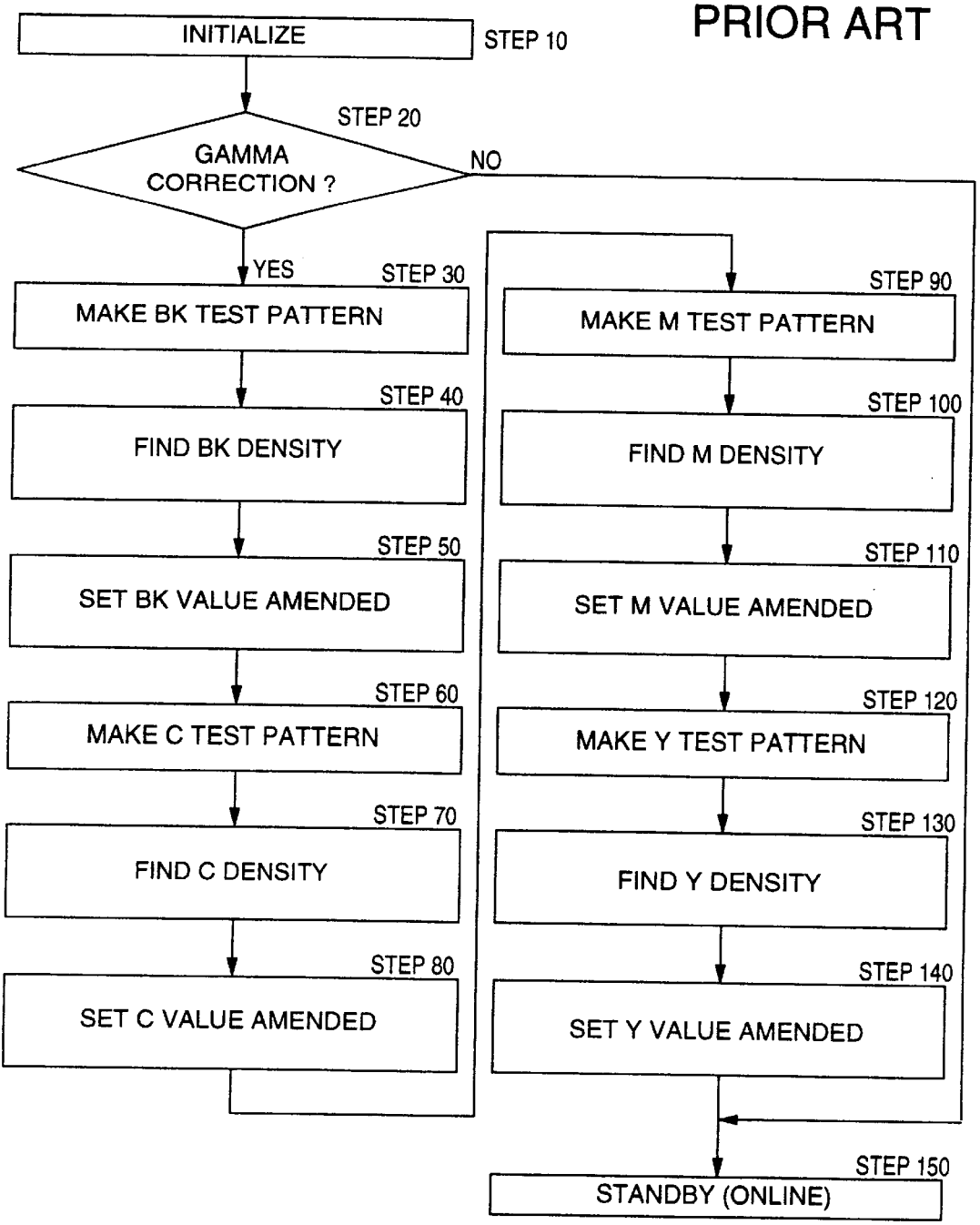
FIG. 12 is a flow chart of a conventional gamma correction sequence.
Figure 13A:
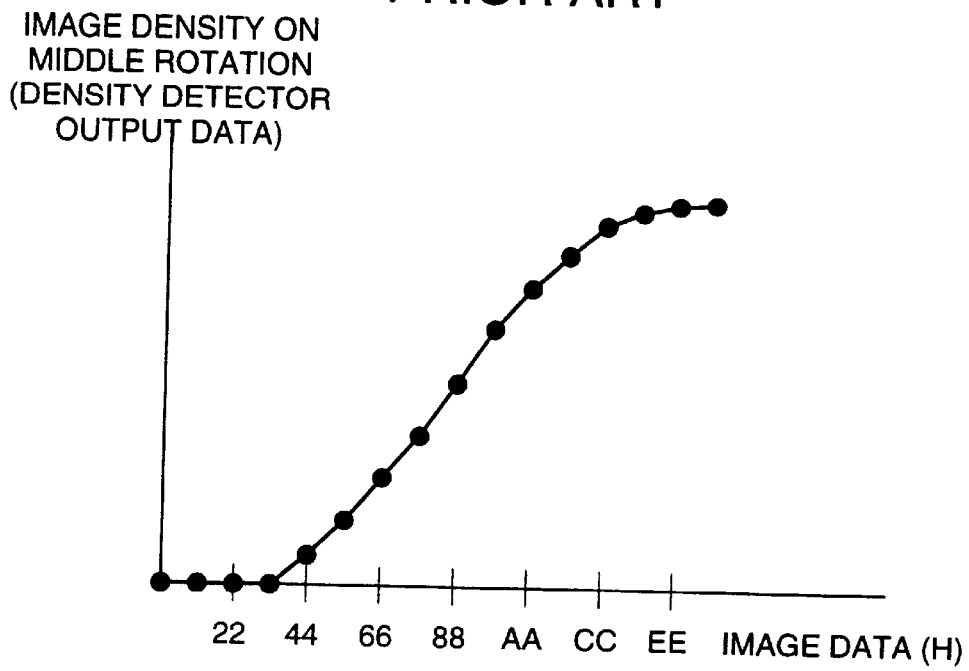
FIG. 13A is a characteristic diagram representing a relation of image data and image density.
Figure 13B:
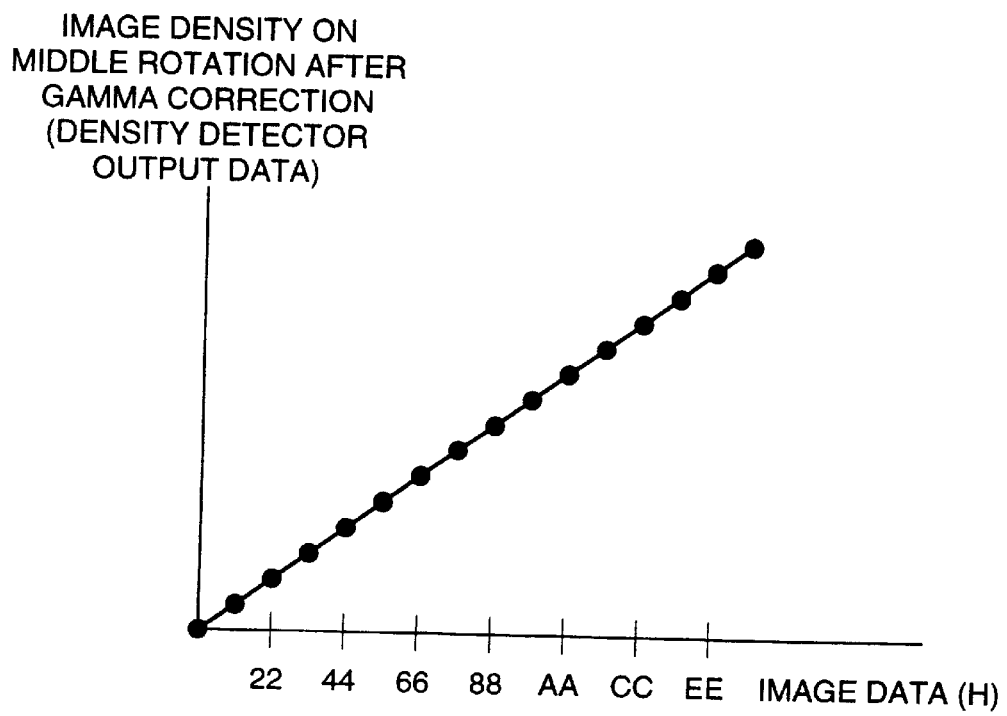
FIG. 13B is a characteristic diagram representing a relation of image data and image density after gamma correction.
Figure 14:
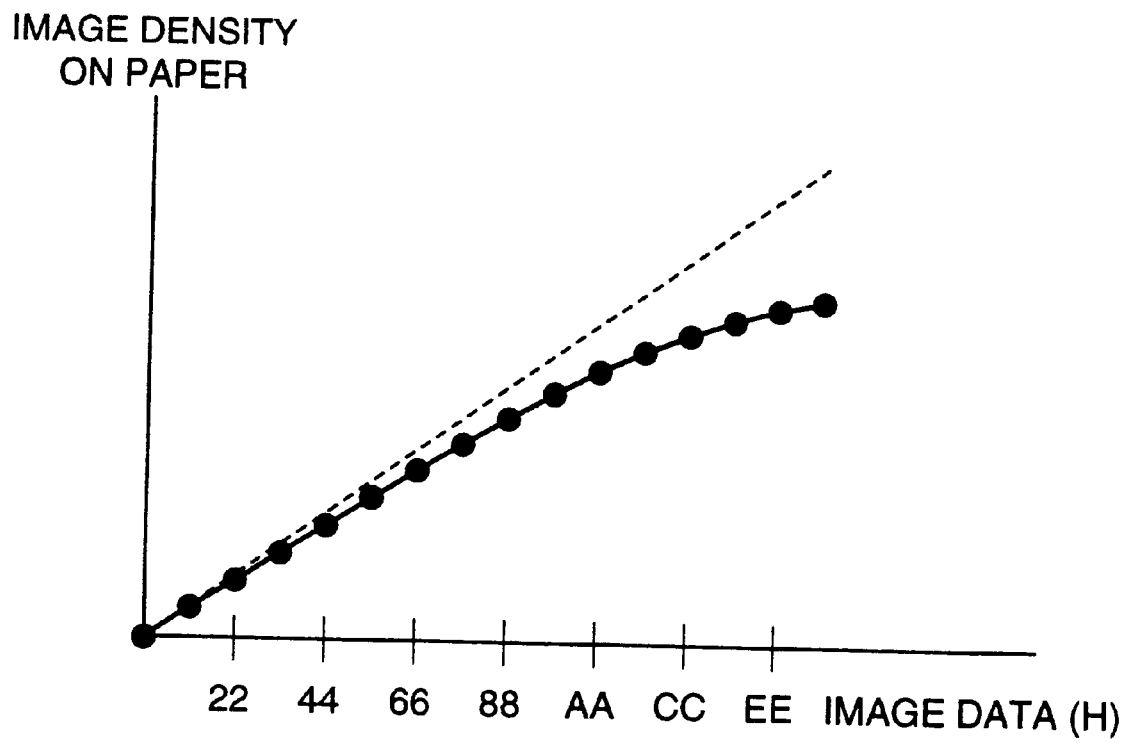
FIG. 14 is a gamma characteristic diagram representing a relation of image data on a paper sheet and image density.

In FIG. 2, reference numeral 4 designates an image processor unit for processing print data from a host computer to output the processed data as image data; reference numeral 5 designates a test pattern generator unit for generating test pattern image data shown in FIG. 11 in order to perform the gamma correction; reference numeral 6 designates a corrector unit for converting image data from the image processor unit 4 and test pattern generator unit 5 into an image data having stable or steady image density; reference numeral 7 designates a modulator unit for optically modulating a light beam of a semiconductor laser (not shown) provided in the exposure optical system 10 based on the converted image data from the corrector unit 6; 1 designates the first density detector unit for detecting the upstream image density before image transfer on the intermediate transfer body 13; 2 designates the second density detector unit for detecting the downstream image density after image transfer on the intermediate transfer body 13; and 25 designates a control unit for inputting the image density data outputted from the first and second density detector units 1 and 2, for performing an arithmetic operation based on the input image density data so as to make the characteristic change of the image data and the image density be linear, and for outputting the resultant processed data to the corrector unit 6.

It should be noted that while in the illustrative embodiment an explanation is made on the basis of the case where the test pattern is generated on the intermediate transfer body 13, the similar effects are also obtainable even when the intended gamma correction is effected by generating the test pattern on the photosensitive drum 8.

Figure 3:
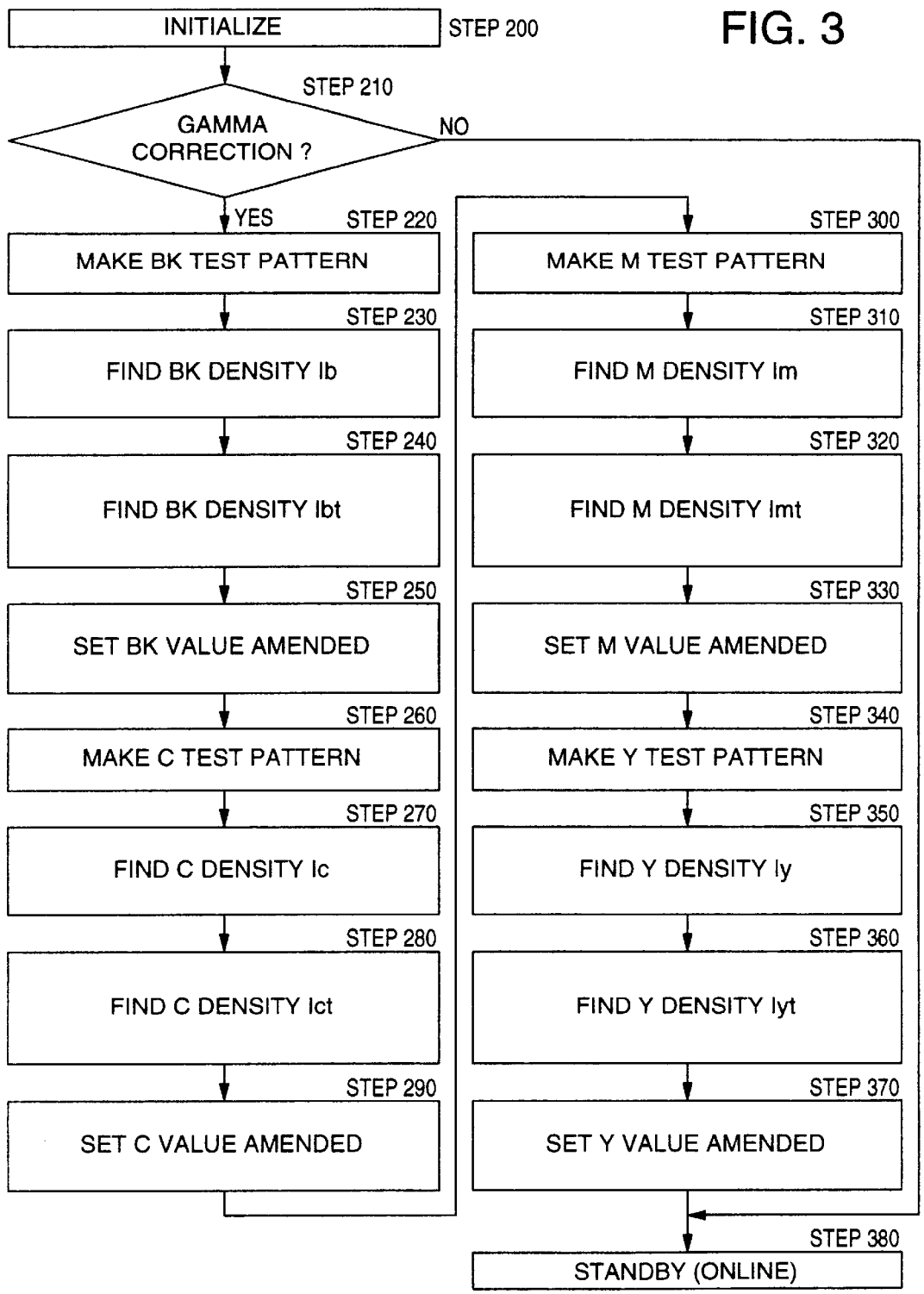
FIG. 3 is a flow chart of the gamma correction sequence of the first embodiment of the present invention.
Figure 4A:
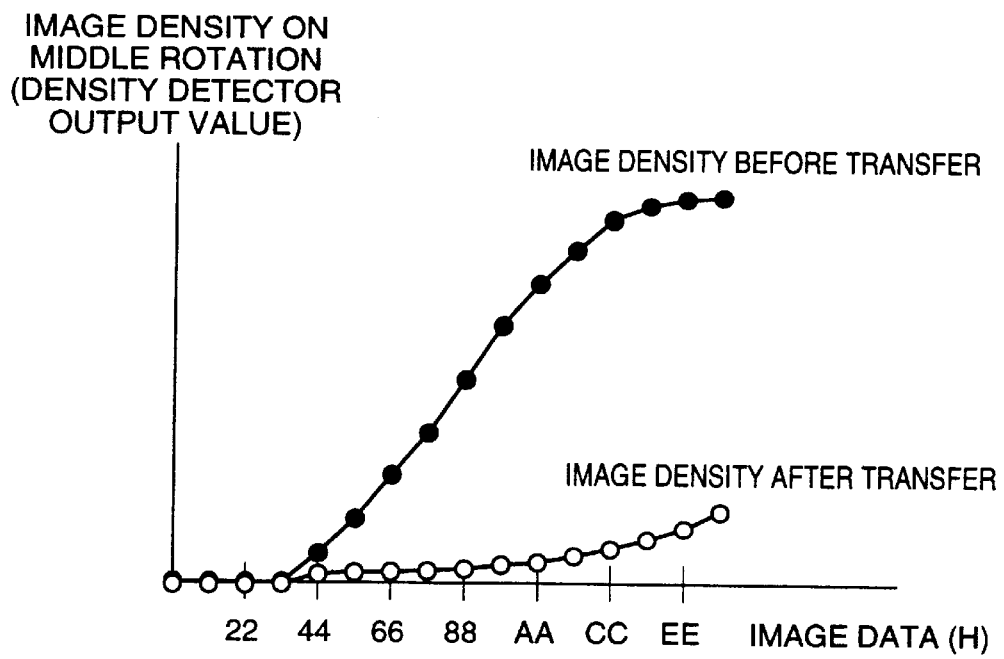
FIG. 4A is a characteristic diagram representing a relation of image data versus image density before image transfer as well as a gamma characteristic diagram representative of a relation of the image data and residual image density after image transfer.
Figure 4B:
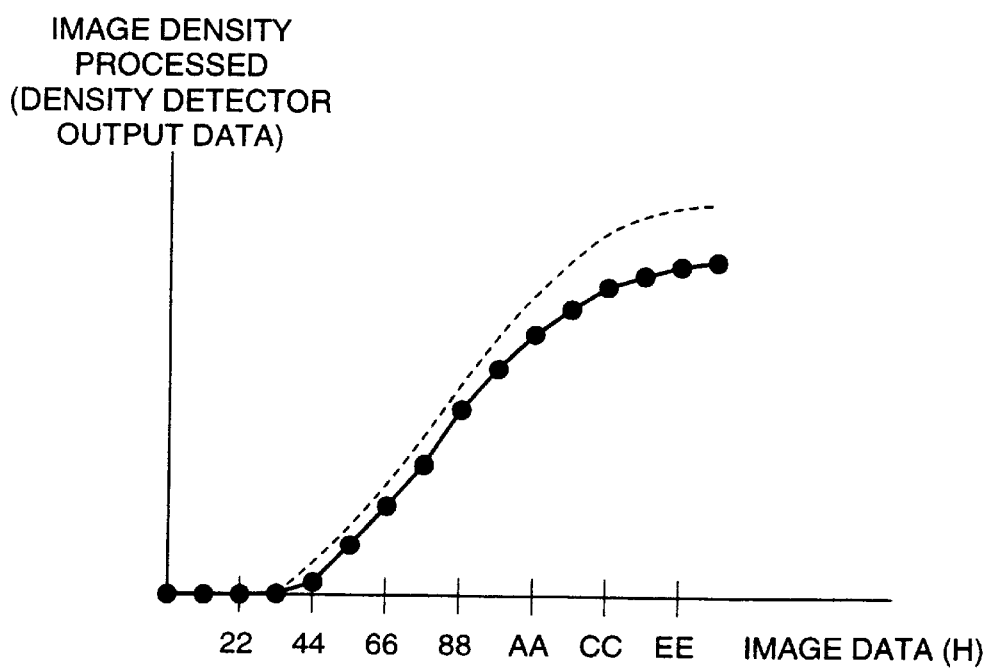
FIG. 4B is a true gamma characteristic diagram indicating a relation of image density as calculated based on the image data before image transfer and the image density after image transfer in the first embodiment of the invention.
Figure 7:
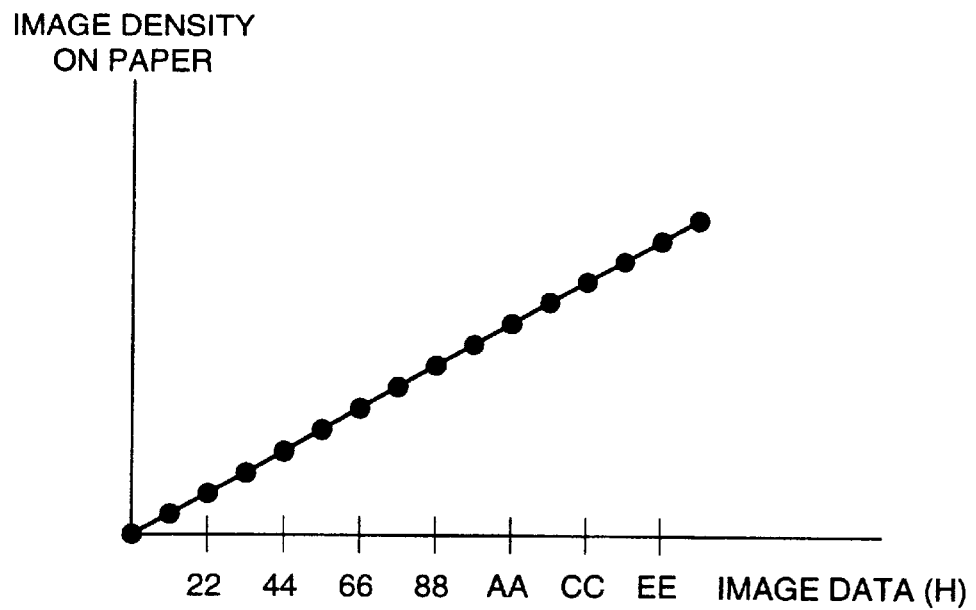
FIG. 7 is a characteristic diagram of image data and image density on a paper sheet after correction in the second embodiment of the present invention.

FIG. 3 is a flow chart of the gamma correction sequence of the first embodiment of the present invention. FIG. 4A is a characteristic diagram representative of a relation of the same image data versus the image density before image transfer (detected by the first density detector unit 1) along with a characteristic diagram indicative of a relation of the image data versus the image density after image transfer (detected by the second density detector unit 2). FIG. 4B is a true gamma characteristic diagram representing a relation of the same image data versus the image density calculated based on both the image density before image transfer (detected by the first density detector unit 1) and residual image density after image transfer (detected by the second density detector unit 2). FIG. 7 is a characteristic diagram of image data on a paper sheet after correction and the image density.

The gamma correcting operation will be explained for compliance with the flow chart of FIG. 3.

First of all, the initialization of LBP is started (step 200). At this step, an input unit (not shown) such as a front panel is used to set whether or not the gamma correction is performed, and the cleaning control unit 3 determines whether or not the gamma correction is performed (step 210). If the gamma correction is performed, then the control unit 25 controls the drive timing of each LBP to output a print signal to the test pattern generator unit 5.

Next, as shown in FIG. 11, the test pattern generator unit 5 sequentially outputs the test pattern image data for black (BK) (step 220). The image data may be 8-bit data consisting of 15 kinds of image data items: 11 (HEX), 22 (HEX), 33 (HEX), 44 (HEX), 55 (HEX), 66 (HEX), 77 (HEX), 88 (HEX), 99 (HEX), AA (HEX), BB (HEX), CC (HEX), DD (HEX), EE (HEX), and FF (HEX). The outputted test pattern image data is converted by a black conversion table for black (not shown) in the corrector unit 6 to optically modulate the semiconductor laser in the exposure optical system 10 by the modulator unit 7.

Here, the conversion table is in one-to-one correspondence in the initial values thereof. The modulated test pattern image data becomes a black toner image on the intermediate transfer body 13, and the first density detector unit 1 detects the black image (toner) density Ib before image transfer in the upstream on the intermediate transfer body 13 (step 230). A sheet of paper 17 in the paper cassette 16 is transported into the main body of the apparatus by the paper-feed roller 18. The second transfer roller 19 transfers it to the paper sheet 17. The black image (toner) density Ibt after image transfer in the downstream on the intermediate transfer body 13 is detected at the second density detector unit 2 (step 240).

Note here that although the transfer is performed to the real paper sheet 17 in order to improve the accuracy of gamma correction while detecting the image density in the downstream on the intermediate transfer body 13 after the image transfer is effected, the transfer may be done not to the real paper sheet 17 but to the second transfer roller 19 which is then cleaned to thereby'enable elimination of ablation or wastage of the paper sheet 17 due to such gamma correction (FIG. 1).

The detected image density typically exhibits its characteristics prior to effectuation of image transfer and after the image transfer as shown in FIG. 4A. As indicated by the illustrative characteristics, the higher the image density data, the lower the image transfer efficiency letting it reside as a residual image on the intermediate transfer body 13. In other words, the gamma characteristics may change at a time point at which such image is transferred to the paper sheet, which in turn makes it impossible to achieve the excellent continuous shading gradations.

Then, the control unit 25 calculates the gamma characteristic on the paper sheet as indicated by a solid line in FIG. 4B based on a difference (Ib−Ibt) between the upstream black image density Ib before image transfer and the downstream black image density Ibt after the image transfer (step 250). Furthermore, the control unit 25 sets the inverse function before correction, namely, the inverse function of the gamma characteristic indicated by the solid line in FIG. 4B, in the black conversion table (not shown) within the corrector unit 6. Prior to proceeding to the next step, the surface of the intermediate transfer body 13 is cleaned by the cleaning control unit 23, so that any residual toner particles are removed away therefrom.

Similarly, the test pattern image data for cyan (C) is sequentially outputted (step 260). The image density of cyan on the intermediate transfer body 13 is detected by the first and second density detector units 1 and 2 (step 270 and step 280). In order to correct the gamma characteristic to be linear, the inverse function before correction is set in cyan's conversion table (not shown) within the corrector unit 6 (step 290). Prior to entering the next step, the surface of the intermediate transfer body 13 is cleaned by the cleaning control unit 23 to remove any residual toner particles therefrom.

Likewise, the test pattern image data for magenta (M) is sequentially outputted (step 300). The image density of magenta on the intermediate transfer body 13 is detected by the first and second density detector units 1 and 2 (step 310 and step 320). In order to correct the gamma characteristic to be linear, the inverse function before correction is set in magenta's conversion table (not shown) within the corrector unit 6 (step 330). Before entering the next step, the surface of the intermediate transfer body 13 is cleaned by the cleaning control unit 23 to remove any residual toner particles therefrom.

Similarly, the test pattern image data for yellow (Y) is sequentially outputted (step 340). The image density of yellow on the intermediate transfer body 13 is detected by the first and second density detector units 1 and 2 (step 350 and step 360). In order to correct the gamma characteristic to be linear, the inverse function before correction is set in yellow's conversion table (not shown) within the corrector unit 6 (step 370). Before going to the next step, the surface of the intermediate transfer body 13 is cleaned by the cleaning control unit 23 to remove any residual toner particles therefrom.

In this way, the gamma correction is completed with respect to four colors, so that it is possible to correct the gamma characteristic into the linear characteristic as shown in FIG. 7. Lastly, the LBP is set in the standby (online) state (step 380). Here, although the foregoing explanation is given in regard to the initialization after power-up, it may alternatively be possible to recurrently effect the gamma correction once per elapse of a constant time duration.

(Second Embodiment)

A detailed explanation will next be given of a second embodiment of the present invention. One significant principal feature of the second embodiment of the present invention lies in that a test pattern is created by toner on the intermediate transfer body, and in that the intended gamma correction is carried out by use of a difference between toner density values on the intermediate transfer body before toner transfer and thereafter.

Figure 5:
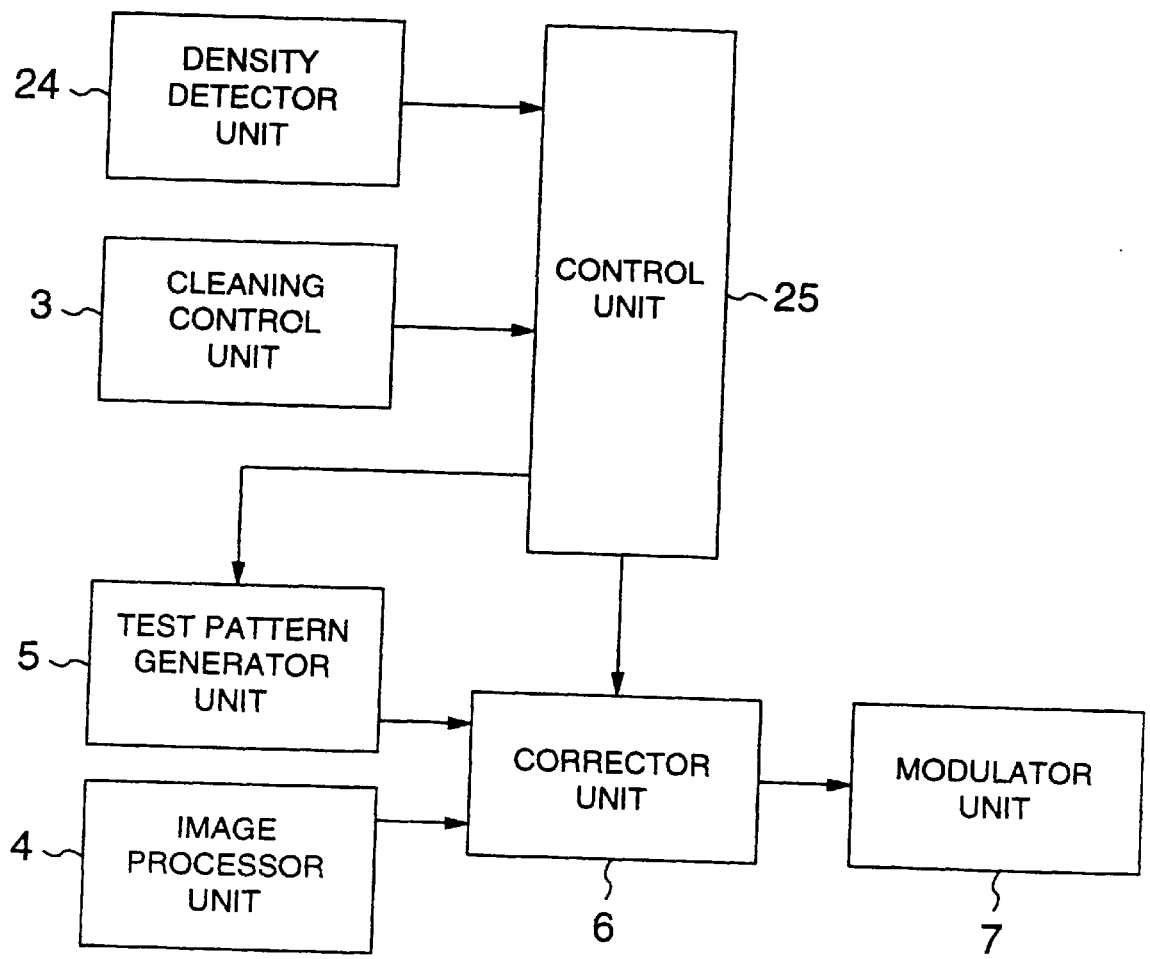
FIG. 5 is a gamma correction control block diagram in a second embodiment of the present invention.

A configuration of an image forming apparatus employing the electrophotography architecture in accordance with the second embodiment may be similar to that in the prior art, and an explanation thereof is eliminated herein. FIG. 5 is a gamma correction control block diagram in the second embodiment of the present invention.

In FIG. 5, reference numeral 4 designates an image processor unit for processing print data from a host computer to output it as image data; 5 designates a test pattern generator unit for generating test pattern image data shown in FIG. 11 in order to perform the gamma correction; 6 designates a corrector unit for converting the image data from the image processor unit 4 and test pattern generator unit 5 into image data having stable image density; 7 designates a modulator unit for optically modulating a semiconductor laser (not shown) in the exposure optical system 10 based on the converted image data from the modulator unit 6; 24 designates a density detector unit for detecting the image density on the intermediate transfer body 13; 3 designates a cleaning control unit for cleaning the surface of the intermediate transfer body 13; and, 25 designates a control unit for inputting the image density data outputted from the density detector unit 24, for performing arithmetic processing using the inputted image density data so as to make the image data and image density characteristics to be linear, and for outputting the resultant processed data to the corrector unit 7.

It is noted that while in the illustrative embodiment an explanation is made on the basis of the case where a test pattern is generated on the intermediate transfer body 13, similar effects are obtainable even when the intended gamma correction is effected by generating the test pattern on the photosensitive drum 8.

Figure 6:
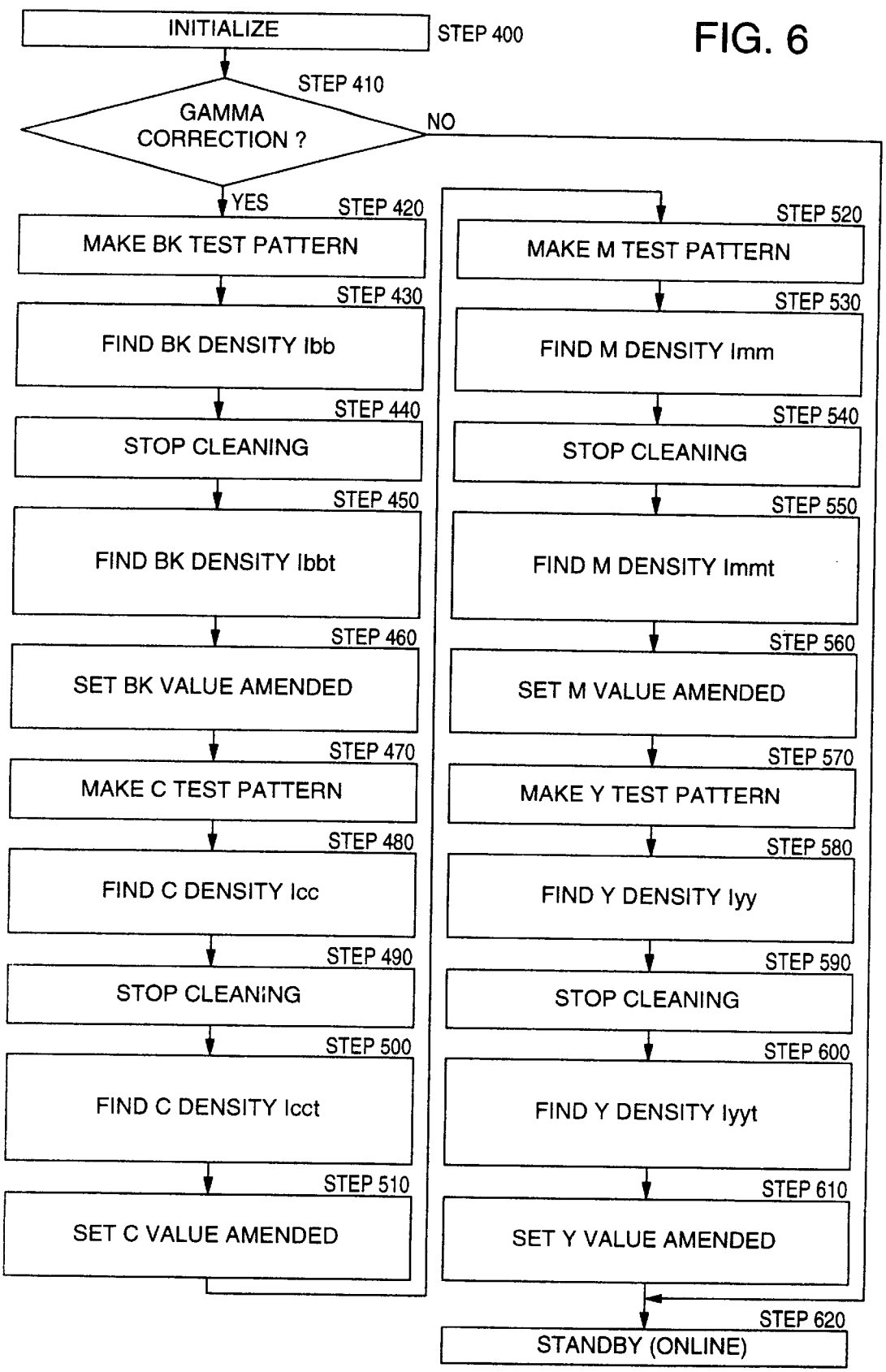
FIG. 6 is a flow chart of the gamma correction sequence of the second embodiment of the present invention.

FIG. 6 is a flow chart of the gamma correction sequence in the second embodiment of the present invention. The gamma correcting operation will be explained in conjunction with the flowchart of FIG. 6.

Firstly, the initialization of LBP is started (step 400). During this step, an input unit (not shown) such as a front panel or the like is used to set whether or not the gamma correction is performed, and then the cleaning control unit 3 determines whether or not the gamma correction is performed (step 410). In the case of effectuation of the gamma correction, the control unit 25 controls the drive timing of each unit, and outputs a print signal to the test pattern generator unit 5.

Figure 9:
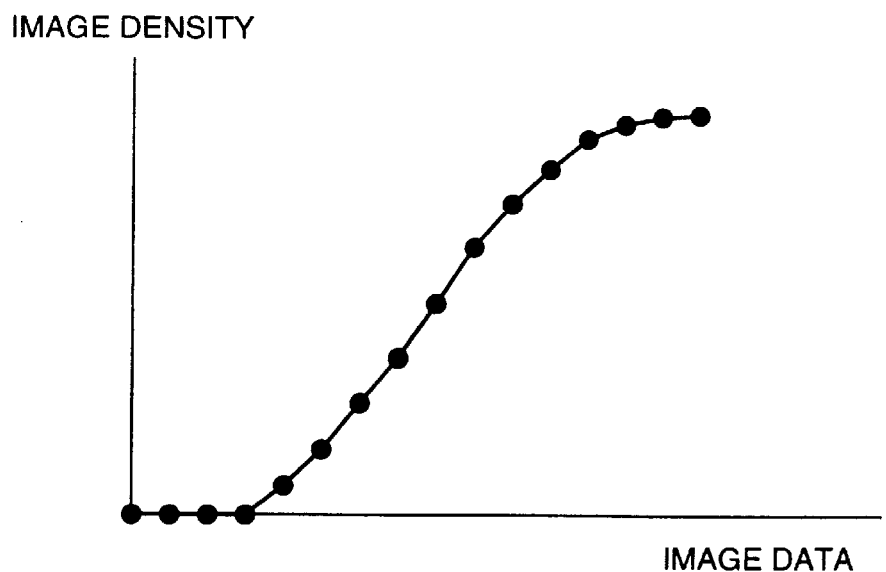
FIG. 9 is a characteristic diagram representing a relation of image data versus image density.
Figure 8:
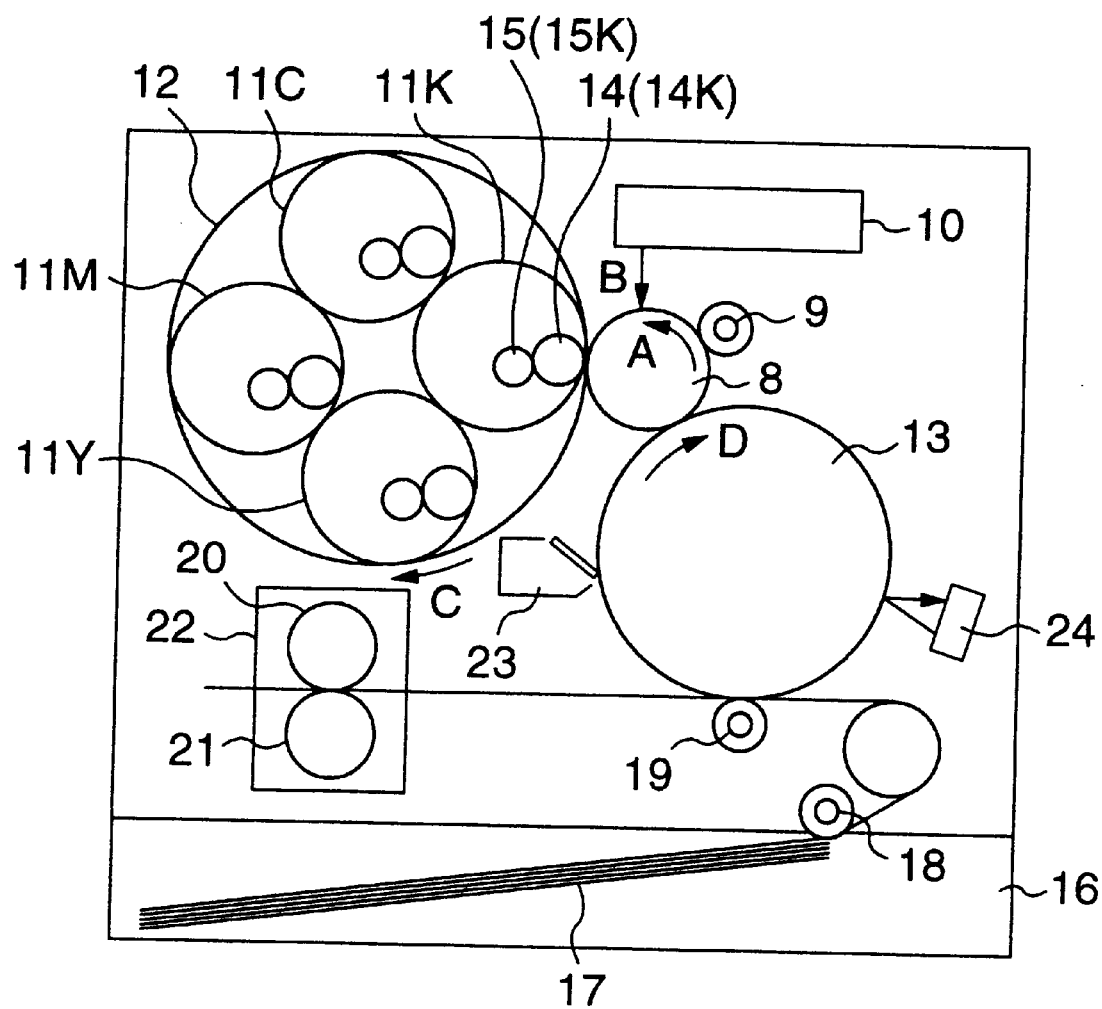
FIG. 8 is a diagram showing a configuration of a color image forming apparatus using a conventional electrophotographic device.
Figure 10:
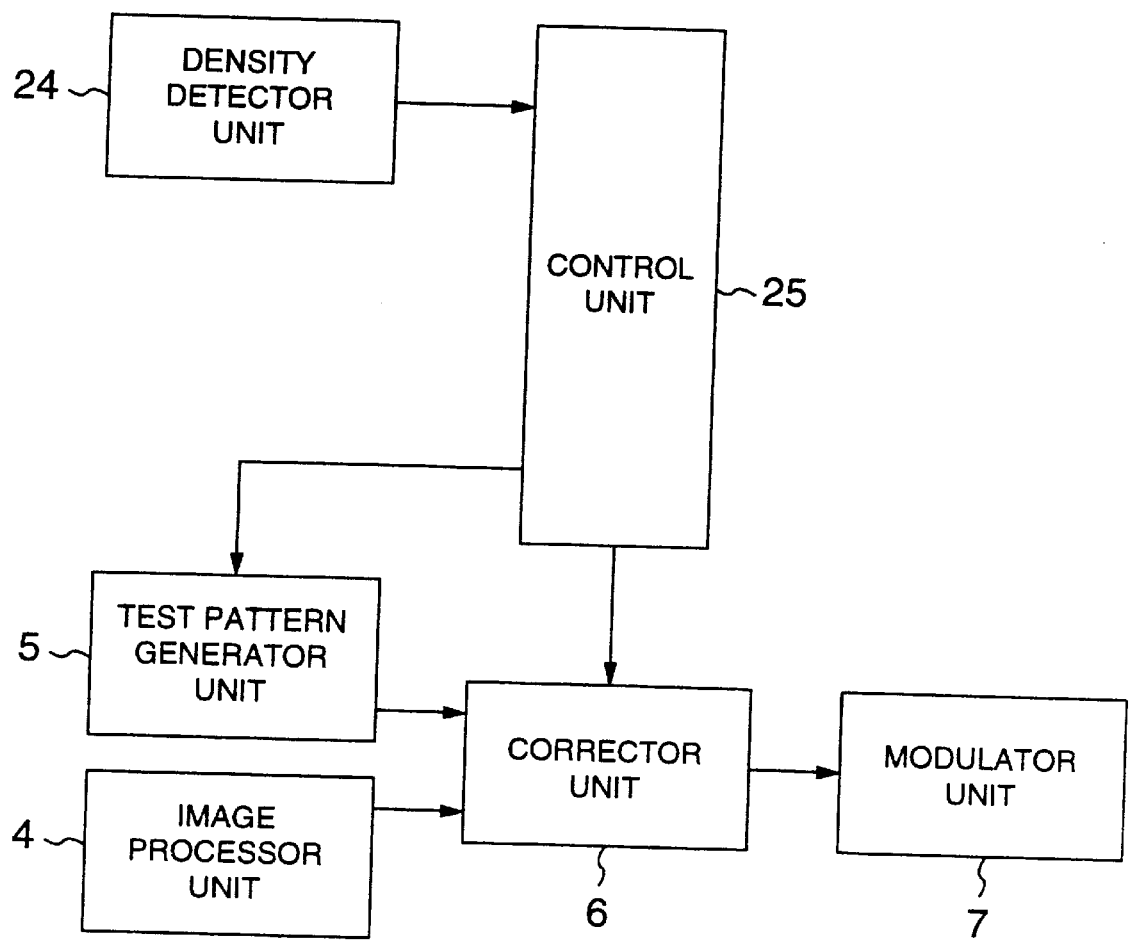
FIG. 10 is a conventional gamma correction control block diagram.

Next, as shown in FIG. 9, the test pattern generator unit 5 sequentially outputs the test pattern image data for black (BK) (step 420). The image data may be 8-bit data consisting of 15 kinds of image data items: 11 (HEX), 22 (HEX), 33 (HEX), 44 (HEX), 55 (HEX), 66 (HEX), 77 (HEX), 88 (HEX), 99 (HEX), AA (HEX), BB (HEX), CC (HEX), DD (HEX), EE (HEX), and FF (HEX). The output test pattern image data is converted by a black's conversion table (not shown) in the corrector unit 6, and the modulator unit 7 optically modulates the semiconductor laser in the exposure optical system 10.

Here, the conversion table is in one-to-one correspondence in the initial values thereof. The modulated test pattern image data becomes a black toner image on the intermediate transfer body 13. The density detector unit 24 detects the upstream black image (toner) density Ibb before image transfer on the intermediate transfer body 13 (step 430). Further, a sheet of paper 17 inside a paper cassette 16 is transported by a paper-feed roller 18 into the main body. Then, a second transfer roller 19 transfers the image on the paper sheet 17.

Next, the cleaning control unit 3 interrupts cleaning on the intermediate transfer body 13 (step 440). There are residual black toner particles on the intermediate transfer body 13 that rotates in the arrow "D" direction after the completion of the image transfer. The density Ibbt of black image (residual toner) after image transfer is detected by the density detector unit 24 (step 450).

Note here that although transfer is done to the real paper sheet 17 in order to improve the accuracy of gamma correction while detecting the image density after the image transfer in the downstream of the intermediate transfer body 13, the transfer may be effected not to the real paper sheet 17 but to the second transfer roller 19 which is then cleaned. Thereby, the elimination of ablation or wastage of the paper sheet 17 due to the gamma correction can be prevented.

The image density detected generally exhibits its characteristics before image transfer and after the image transfer as depicted in FIG. 4A. As apparent from this drawing, the higher the image density data, the lower the image transfer efficiency letting it reside as a residual image on the intermediate transfer body 13. In other words, the gamma characteristics may change at a time point whereat such image is transferred to the paper sheet, which in turn makes it impossible to achieve the good continuous shading gradations.

Then, the control unit 25 defines through computation the gamma characteristic on the paper sheet as indicated by a solid line in FIG. 4B by a difference (Ibb−Ibbt) between the black image density Ibb before image transfer in the upstream of the intermediate transfer body 13 and the black image density Ibbt after image transfer. Further, the control unit 25 sets the inverse function before correction in a black conversion table (not shown) within the corrector unit 6 in order to correct the gamma characteristic to be linear (step 460).

Similarly, the test pattern image data for cyan (C) is sequentially outputted (step 470). Both of the image density of cyan before the image transfer and the image density of cyan after image transfer on the intermediate transfer body 13 are detected by the detector unit 23 (steps 480–500). In order to correct the gamma characteristic to be linear, the inverse function before correction is set in a cyan's conversion table (not shown) within the corrector unit 6 (step 510).

Similarly, the test pattern image data for magenta (M) is sequentially outputted (step 520). Both of the image density of magenta before image transfer and the image density of magenta after image transfer on the intermediate transfer body 13 are detected by the detector unit 23 (steps 530–550). In order to correct the gamma characteristic to be linear, the inverse function before correction is set in a magenta's conversion table (not shown) within the corrector unit 6 (step 560).

Similarly, the test pattern image data for yellow (Y) is sequentially outputted (step 570). Both of the image density of yellow before image transfer and the image density of cyan after image transfer on the intermediate transfer body 13 are detected by the detector unit 23 (steps 580–600). In order to correct the gamma characteristic to be linear, the inverse function before correction is set in a yellow's conversion table (not shown) within the corrector unit 6 (step 610).

In this way, the gamma correction is completed with respect to four colors, so that it is possible to correct the gamma characteristic into the linear characteristic as shown in FIG. 7. Lastly, the LBP is set in the standby (online) state (step 620). Here, although the foregoing explanation is given in regard to the initialization after power-up, it may alternatively be possible to recurrently effect the gamma correction once per elapse of a constant time duration.

(Third Embodiment)

A detailed explanation will next be given of a third embodiment of the present invention. Typically, the calculation of correction data and the setup into the correction unit are to be carried out either when the initialization is effected upon power-up or at every instant at which a fixed length of time has elapsed. However, the resulting gamma characteristic can vary with an environmental variation, which would result in incapability of achievement of the excellent continuous shading gradations required.

To avoid this, the control unit 25 detects the image density before image transfer and the image density after image transfer at every instant for image formation in a non-print region, for example, a blank space between paper sheets. Then, in order to correct the gamma characteristic based on the change amount of the image density, the control unit 25 corrects or "updates" the conversion table (not shown) every time a paper blank space comes. As a result, the resulting gamma characteristic has linearity, so that it is possible to amend it into a linear characteristic shown in FIG. 7.

As has been described above, according to the present invention, it becomes possible to provide an image forming apparatus which achieves the good continuous shading gradations by detecting both of the image density before image transfer and the image density after image transfer to correct the gamma characteristic to be linear, including the compensation for a change in the gamma characteristic due to the variation in transfer efficiency due to the image density. Furthermore, by detecting the image density before image transfer and the image density after image transfer at the blank space between the sheets to amend the conversion table (not shown) once per between-the-paper blank space in order to amend the change amount of the gamma characteristic due to any possible environmental variations so that it exhibits linearity, it becomes possible to provide the intended image forming apparatus capable of attaining the excellent continuous shading gradations.

What is claimed is:

1. An image forming apparatus for performing gamma correction based on an image density on a photosensitive body or an intermediate transfer body, comprising:

test pattern generator means for generating a test image on said photosensitive body or said intermediate transfer body;

a toner transfer section;

first density detector means provided upstream of said toner transfer section with respect to a rotation direction of said photosensitive body or said intermediate transfer body, for detecting a pre-transfer image density on said photosensitive body or said intermediate transfer body before an image transfer at said toner transfer section;

second density detector means provided downstream of said toner transfer section with respect to the rotation direction of said photosensitive body or said intermediate transfer body for detecting a post-transfer image density on said photosensitive body or said intermediate transfer body after said image transfer at said toner transfer section;

corrector means for correcting image data; and control means for calculating correction data for use in correcting said image data based on said pre-transfer image density data outputted from said first density detector means and said post-transfer image density data outputted from said second density detector means and for setting said correction data in said corrector means.

2. An image forming apparatus according to claim 1, wherein said control means calculates the correction data based on a difference between said pre-transfer image density data outputted from said first density detector means and said post-transfer image density data outputted from said second density detector means.

3. An image forming apparatus according to claim 1, wherein the calculation of the correction data and set-up of said corrector means are performed upon power-up or with constant time intervals.

4. An image forming apparatus according to claim 1, wherein the calculation of the correction data and setup of said corrector means are performed in a non-print region once per image formation.

5. An image forming apparatus according to claim 1, wherein said toner transfer section comprises means for transferring said test image from said photosensitive body to said intermediate body.

6. An image forming apparatus according to claim 1, wherein said toner transfer section comprises means for transferring said test image from said photosensitive body or said intermediate body to a sheet of paper.

7. An image forming apparatus for performing gamma correction based on an image density on a photosensitive body or an intermediate transfer body, comprising:

test pattern generator means for generating a test image on said photosensitive body or said intermediate transfer body;

a toner transfer section;

density detector means provided upstream and downstream of said toner transfer section with respect to a rotation direction of said photosensitive body or said intermediate transfer body, for detecting a pre-transfer image density on said photosensitive body or said intermediate transfer body before an image transfer at said toner transfer section, and for detecting a post-transfer image density on said photosensitive body or said intermediate transfer body after said image transfer at said toner transfer section;

corrector means for correcting image data by performing said gamma correction; and control means for calculating correction data for use in correcting the image data based on said pre-transfer image density data and said post-transfer image density data, both of which are outputted from said density detector means, and setting the correction data in said corrector means.

8. An image forming apparatus according to claim 7, further comprising cleaning control means for performing cleaning on said photosensitive body or said intermediate transfer body.

9. An image forming apparatus according to claim 8, wherein said cleaning control means interrupts effectuation of cleaning on said photosensitive body or said intermediate transfer body until detection of said post-transfer image density.

10. An image forming apparatus according to claim 7, wherein said control means calculates the correction data based on a difference between said pre-transfer image density and said post-transfer image density.

11. An image forming apparatus according to claim 7, wherein the calculation of the correction data and set-up of said corrector means are performed upon power-up or with constant time intervals.

* * * * *